US012730336B2

(12) United States Patent
Hirata et al.

(10) Patent No.: US 12,730,336 B2

(45) Date of Patent: Sep. 8, 2026

(54) OPTICAL WAVEGUIDE DEVICE, AND OPTICAL MODULATION DEVICE AND OPTICAL TRANSMISSION APPARATUS USING SAME

(71) Applicant: SUMITOMO OSAKA CEMENT CO., LTD., Tokyo (JP)

(72) Inventors: Shotaro Hirata, Tokyo (JP); Kosuke Okahashi, Tokyo (JP); Yu Kataoka, Tokyo (JP); Yumi Murata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 18/692,490

(22) PCT Filed: Sep. 30, 2022

(86) PCT No.: PCT/JP2022/036840

§ 371 (c)(1),
(2) Date: Mar. 15, 2024

(87) PCT Pub. No.: WO2024/069977

PCT Pub. Date: Apr. 4, 2024

(65) Prior Publication Data

US 2025/0224632 A1 Jul. 10, 2025

(51) Int. Cl.

*G02F 1/035* (2006.01)
*G02F 1/025* (2006.01)
*G02F 1/03* (2006.01)

(52) U.S. Cl.

CPC .............. *G02F 1/035* (2013.01); *G02F 1/025* (2013.01); *G02F 1/0327* (2013.01); *G02F 2201/02* (2013.01); *G02F 2201/063* (2013.01)

(58) Field of Classification Search

CPC ........ G02F 1/025; G02F 1/0327; G02F 1/035; G02F 2201/02; G02F 2201/063

See application file for complete search history.

(56) References Cited

U.S. PATENT DOCUMENTS 12,292,627 B2 * 5/2025 Take ...................... G02F 1/225
2002/0146190 A1 10/2002 Doi
2010/0232736 A1 9/2010 Ichikawa (Continued)

FOREIGN PATENT DOCUMENTS

JP 2010-096958 A 4/2010
JP 2012-053277 A 3/2012

(Continued)

*Primary Examiner* — Daniel Petkovsek

(74) *Attorney, Agent, or Firm* — IPHORGAN LTD.

(57) ABSTRACT

In an optical waveguide device, absorption of light by a control electrode is suppressed and peeling of a dielectric layer is prevented. An optical waveguide device of the present invention includes a substrate on which a rib type optical waveguide is formed, and a control electrode disposed next to the optical waveguide, in which an end portion of the control electrode facing to the optical waveguide is positioned in a first recess portion of the substrate, a dielectric layer that covers the optical waveguide is provided, a second recess portion that is further recessed from a shallowest position of the first recess portion is provided in a part of the first recess portion at a base part of the optical waveguide, and the dielectric layer is disposed in the second recess portion.

6 Claims, 9 Drawing Sheets

(56) References Cited

U.S. PATENT DOCUMENTS

2012/0050842 A1 3/2012 Kondo
2022/0100010 A1 3/2022 Kataoka
2023/0221590 A1* 7/2023 Motoya ................ G02F 1/0316
385/2

FOREIGN PATENT DOCUMENTS

JP 2022-056979 A 4/2022
WO 2007/114367 A1 10/2007

* cited by examiner 2
10
1

OPTICAL WAVEGUIDE DEVICE, AND OPTICAL MODULATION DEVICE AND OPTICAL TRANSMISSION APPARATUS USING SAME

CROSS REFERENCE TO RELATED APPLICATIONS

This application is a national stage completion application of PCT Application No. PCT/JP2022/036840, filed Sep. 30, 2022. The application is incorporated by reference herein in its entirety.

TECHNICAL FIELD

The present invention relates to an optical waveguide device, and an optical modulation device and an optical transmission apparatus using the same, and particularly to an optical waveguide device including a substrate on which an optical waveguide is formed, and a control electrode disposed close to the optical waveguide on the substrate, and an optical modulation device and an optical transmission apparatus using the same.

BACKGROUND ART

In the field of optical measurement technology or in the field of optical communication technology, particularly in high-frequency/high-capacity optical fiber communication systems, an optical transmission apparatus in which an optical modulator is configured with an optical waveguide device including a substrate on which an optical waveguide is formed, and in which the optical modulator is incorporated has been widely used. Among optical waveguide devices, an optical waveguide device in which $LiNbO_3$ (hereinafter, referred to as LN) having an electro-optic effect is used in the substrate may implement optical modulation characteristics of having a less optical loss and a wider band than an optical waveguide device using a semiconductor-based material such as indium phosphide (InP), silicon (Si), or gallium arsenide (GaAs). Thus, the optical waveguide device using the LN substrate has been widely used in the high-frequency/high-capacity optical fiber communication systems.

Meanwhile, in accordance with a trend of an increased transmission capacity in recent years, a transmission format in which multi-polarization is incorporated in multi-level modulation, such as dual polarization-quadrature phase shift keying (DP-QPSK) or DP-16 quadrature amplitude modulation (QAM), has been mainly used as a modulation method in optical fiber communication systems.

Widespread use of Internet services in recent years has further increased communication traffic, and achieving further size reduction, wider bands, and power saving of the optical waveguide device is being studied.

As one of solutions of achieving size reduction, wider bands, and power saving of an optical modulation element, a rib type optical waveguide (refer to Patent Literature No. 1) in which a protruding portion having a band shape is formed on a surface of a thinned LN substrate (for example, having a thickness of 20 μm or less) to further strengthen an interaction between a signal electric field and waveguide light in the substrate (that is, to increase electric field efficiency), or an optical waveguide device using a diffused waveguide formed by diffusing Ti has been used in practice.

Currently, providing a control electrode close to a position of the optical waveguide to further increase the electric field efficiency for higher frequencies is also being studied. Meanwhile, bringing the electrode closer causes light propagating through the optical waveguide to be absorbed by the electrode, and the optical loss is increased.

Furthermore, covering the optical waveguide with a dielectric layer (permanent resist; a $SiO_2$ layer or the like) achieves an effect of preventing scattering of light, and the optical loss can be reduced (refer to Patent Literature No. 1). Furthermore, disposing the dielectric layer in an electrode clearance can increase the electric field efficiency.

However, in a case where the dielectric layer peels from the optical waveguide because of an ambient temperature change or of an impact, an air layer is formed around the optical waveguide, and roughness of a surface of the optical waveguide or a difference in a refractive index between the optical waveguide and the air layer is increased. Thus, scattering of light is likely to occur. Furthermore, in a case where the dielectric layer between the optical waveguide and the electrode peels, this results in a decrease in the electric field efficiency and an increase in a drive voltage.

CITATION LIST

Patent Literature

[Patent Literature No. 1] Japanese Laid-open Patent Publication No. 2022-56979 (JP2022-056979A)

SUMMARY OF INVENTION

Technical Problem

An object to be solved by the present invention is to solve the above problem and to provide an optical waveguide device in which absorption of light propagating through an optical waveguide by a control electrode is suppressed and in which peeling of a dielectric layer covering the optical waveguide is prevented. Furthermore, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.

(1) An optical waveguide device includes a substrate on which an optical waveguide is formed, and a control electrode disposed close to the optical waveguide on the substrate, in which the optical waveguide is a rib type optical waveguide, an end portion of the control electrode close to the rib type optical waveguide is positioned in a first recess portion of the substrate that forms the rib type optical waveguide, a dielectric layer that covers the rib type optical waveguide is provided, a second recess portion that is further recessed from a shallowest position of the first recess portion is provided in a part of the first recess portion near a base part of the rib type optical waveguide, and the dielectric layer is disposed in at least a part of the second recess portion.

(2) In the optical waveguide device according to (1), the dielectric layer is continuously formed between the rib type optical waveguide and the control electrode.

(3) In the optical waveguide device according to (1), the second recess portion includes an inclined surface that becomes shallower towards the control electrode from the rib type optical waveguide, and an inclination angle formed by the inclined surface with respect to a plane parallel to an entire surface of the substrate is 20 degrees or less.

(4) In the optical waveguide device according to (1), a depth of a deepest position of the second recess portion based on the shallowest position of the first recess portion is 0.07 μm or less.

(5) In the optical waveguide device according to (1), a cross section area that is a cross section area of the second recess portion formed by a cross section of the second recess portion perpendicular to a direction in which the rib type optical waveguide extends and that is occupied by a part deeper than the shallowest position of the first recess portion is 0.05 $\mu m^2$ or less.

(6) In the optical waveguide device according to (1), the substrate disposed under the control electrode includes a protruding portion that is formed in the first recess portion and that is different from the rib type optical waveguide, a third recess portion that is further recessed from the shallowest position of the first recess portion is provided in a part of the first recess portion near a base part of the protruding portion, and the control electrode is disposed in at least a part of the third recess portion.

(7) In the optical waveguide device according to (1), a maximum thickness of the substrate is 20 μm or less.

(8) An optical modulation device includes the optical waveguide device according to any one of (1) to (7), a case accommodating the optical waveguide device, and an optical fiber through which a light wave is input into the optical waveguide or output from the optical waveguide.

(9) In the optical modulation device according to (8), the control electrode is a modulation electrode for modulating the light wave propagating through the optical waveguide, and an electronic circuit that amplifies a modulation signal to be input into the modulation electrode is provided inside the case.

(10) An optical transmission apparatus includes the optical modulation device according to (9), a light source that inputs a light wave into the optical modulation device, and an electronic circuit that outputs a modulation signal to the optical modulation device.

Advantageous Effects of Invention

In the present invention, an optical waveguide device includes a substrate on which an optical waveguide is formed, and a control electrode disposed close to the optical waveguide on the substrate, in which the optical waveguide is a rib type optical waveguide, an end portion of the control electrode close to the rib type optical waveguide is positioned in a first recess portion of the substrate that forms the rib type optical waveguide, a dielectric layer that covers the rib type optical waveguide is provided, a second recess portion that is further recessed from a shallowest position of the first recess portion is provided in a part of the first recess portion near a base part of the rib type optical waveguide, and the dielectric layer is disposed in at least a part of the second recess portion. Thus, it is possible to suppress optical absorption of the control electrode by strengthening confinement of light using the second recess portion formed in the first recess portion and to prevent the dielectric layer covering the optical waveguide from peeling by increasing joining strength between the dielectric layer and the substrate using the second recess portion.

Furthermore, the optical waveguide device having such advantageous characteristics can also be used to provide an optical modulation device and an optical transmission apparatus that achieve the same effect.

DESCRIPTION OF EMBODIMENTS

Hereinafter, an optical waveguide device of the present invention will be described in detail using preferred examples.

Figure 3:
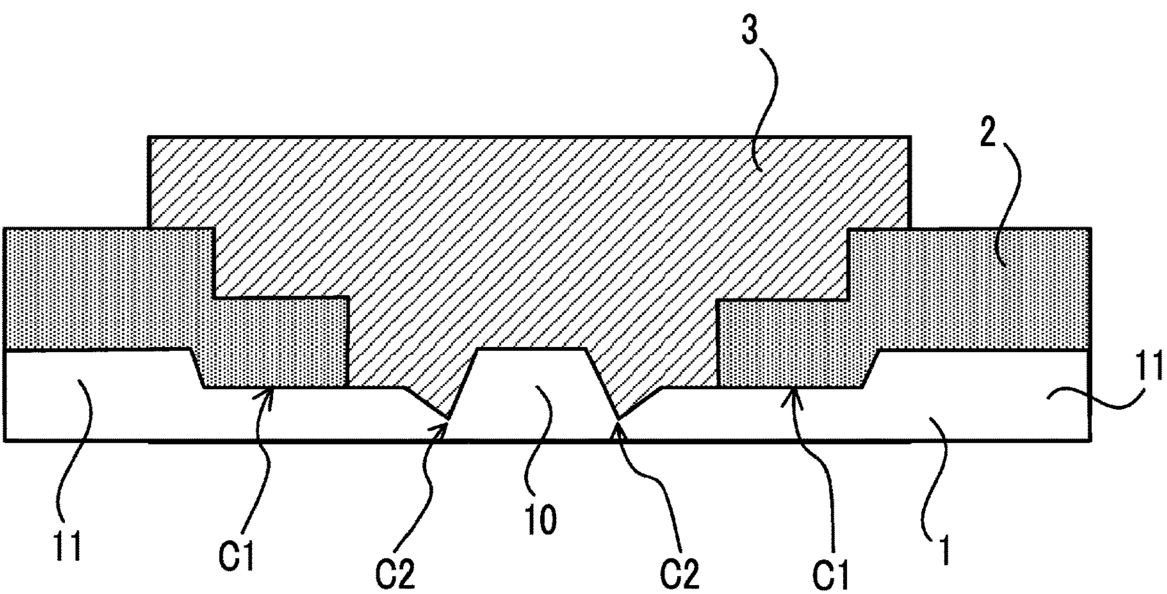
FIG. 3 is a cross section view illustrating a first example related to an optical waveguide device of the present invention.
Figure 4:
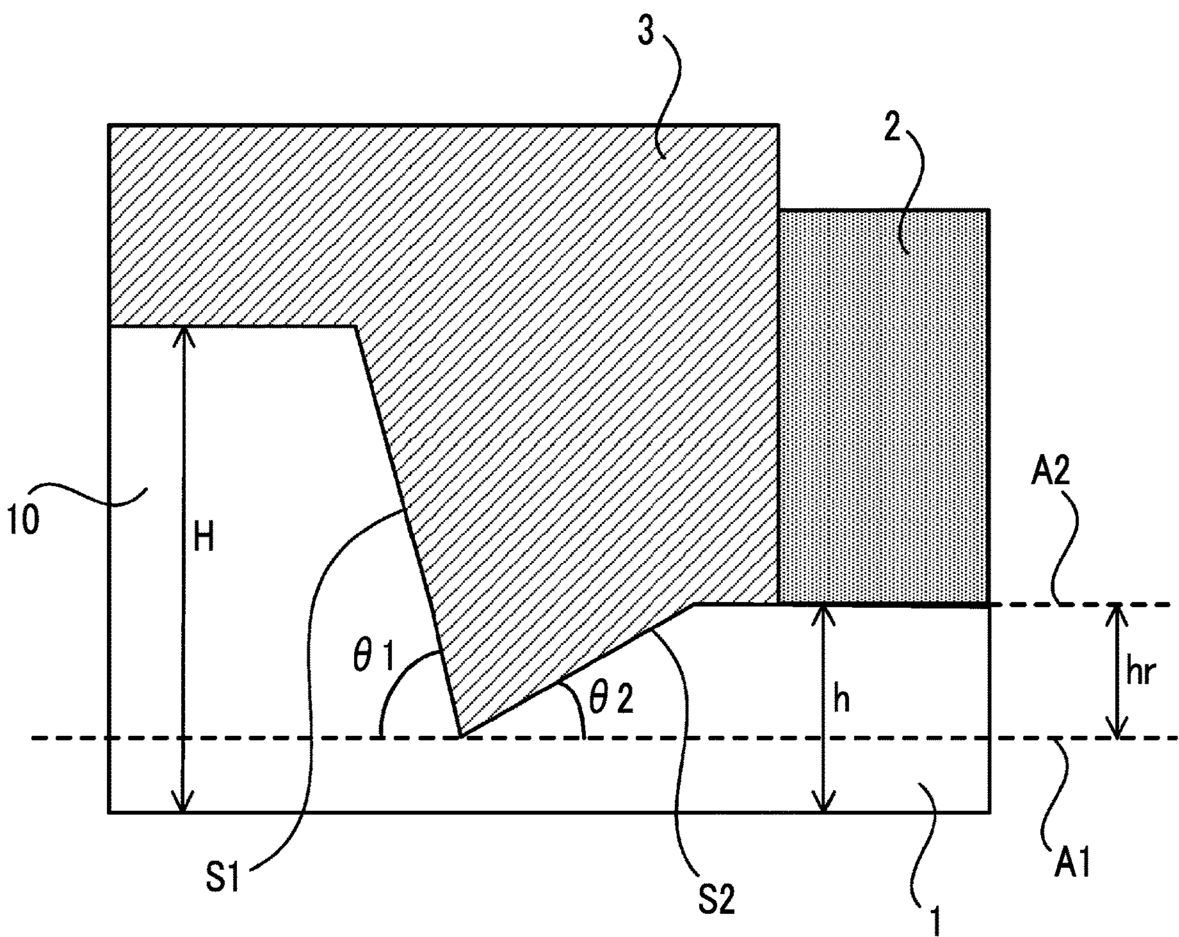
FIG. 4 is an enlarged view of and near a rib type optical waveguide in FIG. 3.
Figure 5:
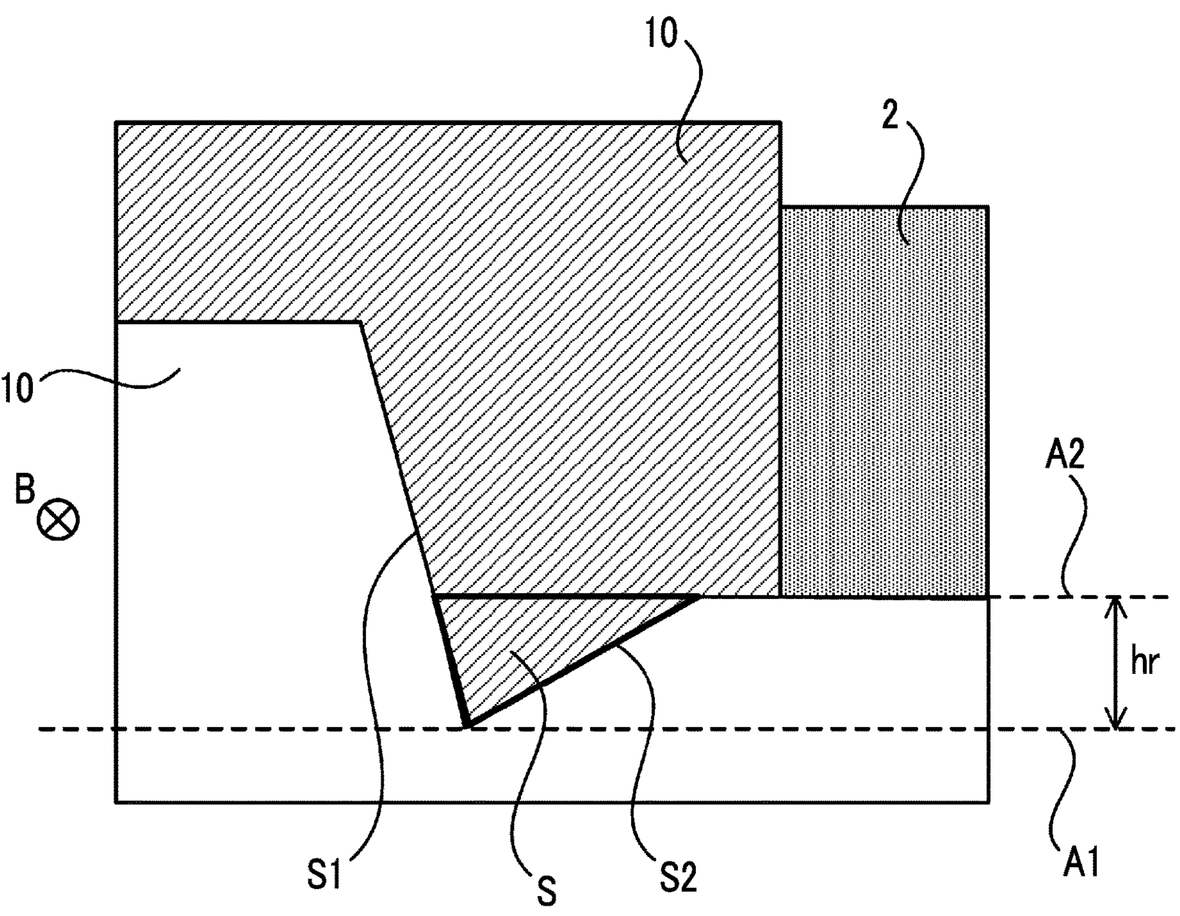
FIG. 5 is an enlarged view of and near the rib type optical waveguide in FIG. 3.
Figure 6:
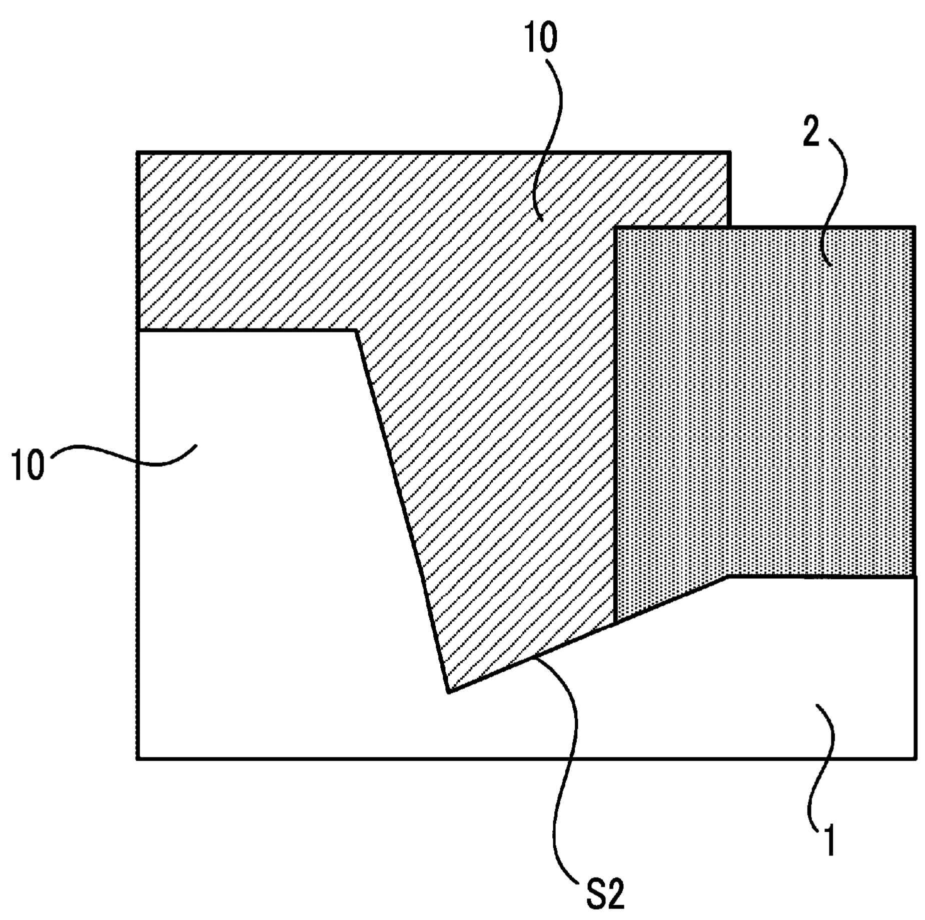
FIG. 6 is a cross section view illustrating a second example related to the optical waveguide device of the present invention.

A cross section view illustrating an example of the optical waveguide device of the present invention is illustrated in FIG. 3. In addition, FIGS. 4 and 5 are enlarged views of and near a rib type optical waveguide 10 in FIG. 3.

The optical waveguide device of the present invention includes a substrate 1 on which an optical waveguide is formed, and a control electrode 2 disposed close to the optical waveguide on the substrate, in which the optical waveguide is the rib type optical waveguide 10, an end portion of the control electrode 2 close to the rib type optical waveguide 10 is positioned in a first recess portion C1 of the substrate that forms the rib type optical waveguide 10, a dielectric layer 3 that covers the rib type optical waveguide 10 is provided, a second recess portion C2 that is further recessed from the shallowest position of the first recess portion C1 is provided in a part of the first recess portion C1 near a base part of the rib type optical waveguide 10, and the dielectric layer 3 is disposed in at least a part of the second recess portion C2.

As the substrate 1 used in the optical waveguide device of the present invention, a substrate having an electro-optic effect can be used. Specifically, substrates of lithium niobate (LN), lithium tantalate (LT), lead lanthanum zirconate titanate (PLZT), and the like or base materials obtained by doping these substrate materials with MgO or the like can be used. In addition, these materials can be formed into films using a vapor-phase growth method such as a sputtering method, a vapor deposition method, or a CVD method. In addition, a substrate obtained by joining the substrate having the electro-optic effect to another substrate and then processing the electro-optical substrate into a thin film can be used. Furthermore, a semiconductor substrate, a substrate of an organic material such as EO polymer, and the like can also be used.

As a method of forming the optical waveguide 10, a rib type waveguide obtained by forming a part corresponding to the optical waveguide to have a protruding shape in the substrate by, for example, etching the substrate 1 other than the optical waveguide or by forming grooves on both sides of the optical waveguide can be used. Furthermore, a refractive index can be further increased by diffusing Ti or the like on a surface of the substrate using a thermal diffusion method, a proton exchange method, or the like in accordance with the rib type optical waveguide. The rib type waveguide is a micro rib type optical waveguide having a width and a height of approximately 1 μm as a size in order to increase confinement of light.

As illustrated in FIGS. 3 and 4, a thickness H of the substrate (thin plate) 1 on which the optical waveguide 10 is formed is set to 20 μm or less, preferably 10 μm or less, more preferably 5 μm or less, and still more preferably 1 μm or less or 0.5 μm or less in order to achieve velocity matching between a microwave of a modulation signal and the light wave. In addition, the height (the thickness H of the substrate minus a thickness h of the shallowest part of the first recess portion C1 of the substrate) of the rib type optical waveguide 10 is set to 70 percent or less, more preferably 60 percent or less, and still more preferably 50 percent or less of a height of the substrate H.

In the substrate 1 on which the optical waveguide is formed, a reinforcing substrate (not illustrated) is joined to a lower side of the substrate 1 in order to increase mechanical strength. The substrate 1 and the reinforcing substrate are adhesively fixed via direct joining or through an adhesive layer of resin or the like. The reinforcing substrate to be directly joined preferably has, but is not limited to, a lower refractive index than the optical waveguide or than the substrate on which the optical waveguide is formed. In a case where the refractive index of the reinforcing substrate is higher than the refractive index of the substrate 1, a layer having a lower refractive index than the substrate 1 is provided between the substrate 1 and the reinforcing substrate. In addition, a substrate including a material, for example, an oxide layer of crystal or of glass, having a similar coefficient of thermal expansion to the substrate 1 is preferably used as the reinforcing substrate. Furthermore, the same LN substrate as the substrate 1, or a composite substrate obtained by forming a silicon oxide layer on a silicon substrate and a composite substrate obtained by forming a silicon oxide layer on an LN substrate, which are abbreviated to SOI and LNOI, can also be used.

The control electrode 2 is formed close to the optical waveguide 10 on the substrate 1. The control electrode 2 includes a modulation electrode that applies a modulation signal to the optical waveguide, and a DC bias electrode that applies a DC bias voltage to the optical waveguide. The control electrode is formed as a thick electrode by forming a base electrode using the sputtering method, the vapor deposition method, or the like and then using a plating method. In the present invention, the control electrode is disposed close to the rib type optical waveguide to reduce a drive voltage applied to the control electrode, particularly to the modulation electrode. Thus, as illustrated in FIG. 3, an end portion of the control electrode 2 (an end portion of the control electrode close to the rib type optical waveguide) is disposed in the first recess portion C1 forming the rib type optical waveguide 10.

In addition, as disclosed in Patent Literature No. 1, the dielectric layer 3 is disposed to cover the optical waveguide. In the dielectric layer 3, it is likely that light propagating through the optical waveguide is scattered because of roughness or the like of a surface of the optical waveguide 10 and that an optical propagation loss is increased. In order to suppress this, the dielectric layer 3 configured with a material having a lower refractive index than the optical waveguide is provided. Resin such as a permanent resist, $SiO_2$, or the like can be used as the material constituting the dielectric layer 3.

The dielectric layer 3 is continuously disposed to fill a space between the rib type optical waveguide 10 and the control electrode 2. Accordingly, by disposing the dielectric layer without providing an air layer between the rib type optical waveguide 10 and the control electrode 2, electric field efficiency of an electric field applied to the rib type optical waveguide 10 by the control electrode 2 can be increased.

A feature of the optical waveguide device of the present invention is providing the second recess portion C2, which is further recessed from the shallowest position of the first recess portion C1, near the base part of the rib type optical waveguide 10 and disposing the dielectric layer 3 in at least a part of the second recess portion C2. The second recess portion C2 not only contributes to strengthening confinement of light by the rib type optical waveguide 10 but also exhibits an anchoring effect that prevents peeling of the dielectric layer 3.

In the optical waveguide device to which the present invention is applied, a thin plate having a small thickness is used as described above. Thus, light confined in the rib type optical waveguide 10 has a tendency to spread in a horizontal direction. This tendency is particularly noticeable as the thickness of the substrate 1 is decreased. Thus, by providing the second recess portion C2 and furthermore, by adjusting a shape of the recess portion C2 as will be described later, a confining effect of light can be increased, and an optical absorption loss caused by the control electrode 2 can be suppressed.

Figures 1, 2:
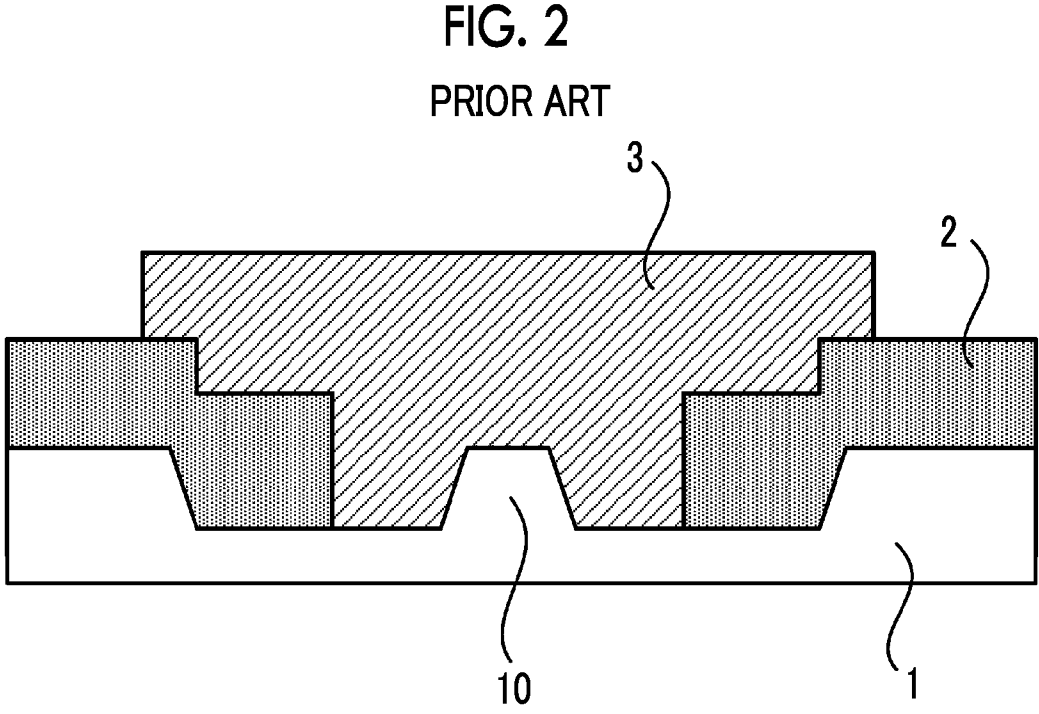
FIG. 1 is a cross section view illustrating an example of an optical waveguide device in the related art.
FIG. 2 is a cross section view illustrating another example of the optical waveguide device in the related art.

As a method of forming the second recess portion C2, overetching is performed in forming the first recess portion C1 via etching. While a deposition discharged by etching is accumulated on and protects a side surface of the rib type optical waveguide 10, etching progresses more on a bottom portion on which the deposition is unlikely to be accumulated, and the second recess portion C2 can be formed. In addition, it is possible to form a resist pattern from the state illustrated in FIG. 1 and selectively etch only a position corresponding to the second recess portion. In addition, the second recess portion can be formed by not only chemical etching but also by selectively removing the surface of the substrate 1 via electron beam irradiation.

The second recess portion C2 is formed with inclined surfaces S1 and S2 as illustrated in FIG. 4. While the inclined surface S1 is displayed as extending on a line extending from the side surface of the rib type optical waveguide 10 in FIG. 4, the present invention is not limited to the inclined surface S1 in FIG. 4 and includes a case where the inclined surface is formed to bend from the side surface of the optical waveguide 10 as illustrated in FIG. 3. Here, only the inclined surface S1 illustrated in FIG. 4 will be used for description.

An inclination of the side surface of the rib type optical waveguide (an inclination θ1 of the inclined surface S1) is 90 degrees or less and preferably 80 degrees or less. However, in a case where the inclination of the side surface of the rib type optical waveguide is excessively small, confinement of light is weakened, absorption of light by the control electrode is increased, or an optical loss caused by bending the waveguide is likely to occur. A possibility of an increase in the optical loss is strong particularly in a case where a folded waveguide is employed. Thus, the inclination of the side surface of the rib type optical waveguide is an inclination higher than 15 degrees and more preferably an inclination higher than 20 degrees. For example, the inclined surface is formed within a range of θ1=20 to 80 degrees.

An inclination angle (θ1 or θ2) of the inclined surface (S1 or S2) is set based on a plane A1 parallel to the entire surface of the substrate 1 as illustrated in FIG. 4. This plane is assumed to be a plane (in a right-left direction of the drawing) extending across the entire substrate without considering fine roughness on the surface of the substrate. In addition, this plane is also a plane parallel to a back surface.

In a case where a depth hr is a constant value, setting the inclination angle θ2 of the inclined surface S2 to 20 degrees or less, preferably 7 degrees or less, more preferably 4 degrees or less, and still more preferably 2 degrees or less can reduce the optical absorption loss. In addition, from the viewpoint of the drive voltage, as the inclination angle is decreased, VπL (V·cm) corresponding to the drive voltage tends to be slightly increased. However, in a case where, for example, θ2 exceeds 4 degrees, VπL tends to be conversely decreased. This tendency is particularly noticeable as the depth hr is increased.

The depth hr is a depth from the shallowest part (dotted line A2) of the first recess portion C1 to the deepest part (dotted line A1) of the second recess portion C2.

In addition, while increasing the depth hr of the second recess portion C2 reduces the optical absorption loss, this increases VπL (V·cm) corresponding to the drive voltage. Thus, the depth hr is set to 0.07 μm or less, preferably 0.05 μm or less, and more preferably 0.03 μm or less.

The drive voltage or the optical absorption loss also changes in a case where an area S (a part surrounded by a triangle of a thick line) of a cross section of the second recess portion C2 has changed as illustrated in FIG. 5. As the area S is increased, VπL (V·cm) corresponding to the drive voltage is increased. In a case where the area S is decreased, the optical absorption loss is increased.

Thus, the area S is preferably set to 0.05 $\mu m^2$ or less.

However, in a case where the area S is 0.05 $\mu m^2$ or more, VπL (V·cm) corresponding to the drive voltage is increased, but the optical absorption loss is decreased. Thus, which of the cases is to be employed can be appropriately selected depending on characteristics required for the optical waveguide device.

In FIGS. 3 to 5, the end portion of the control electrode 2 positioned in the first recess portion is disposed outside the second recess portion C2. However, as the inclination angle θ2 of the inclined surface S2 is decreased, a right end of the inclined surface S2 comes close to the control electrode 2. Disposing the control electrode 2 to enter the second recess portion C2 increases joining strength between the control electrode 2 and the substrate 1. In addition, the electric field can be applied close to the base part of the rib type optical waveguide, and this also contributes to reduction of the drive voltage.

Figure 7:
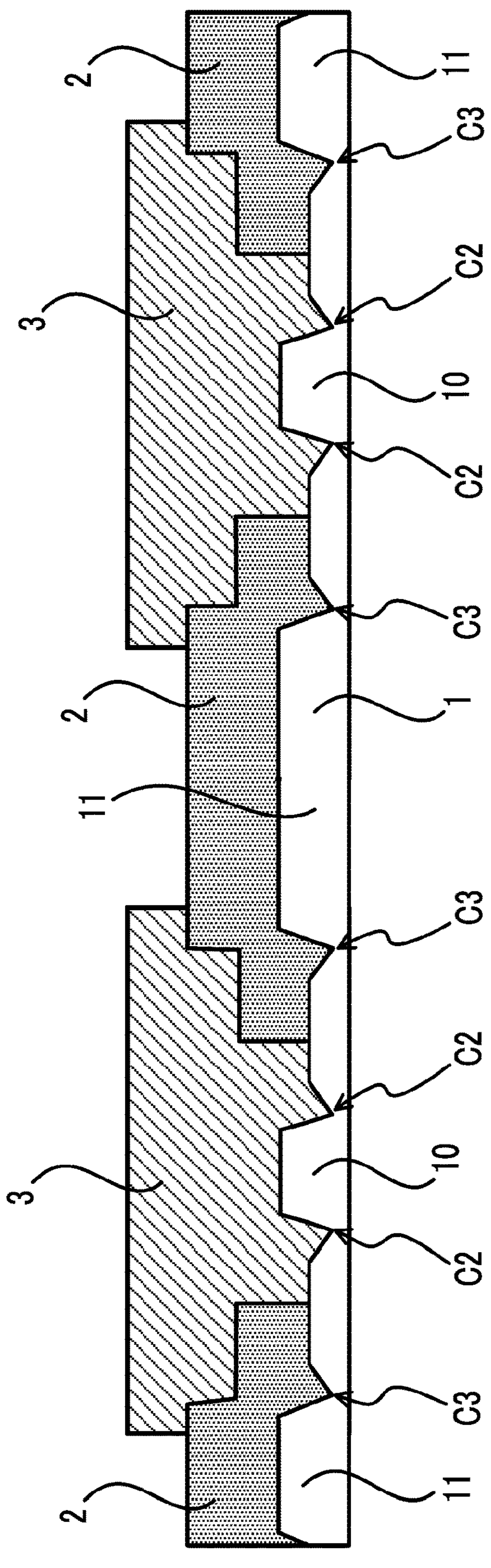
FIG. 7 is a cross section view illustrating a third example related to the optical waveguide device of the present invention.

In addition, as illustrated in FIG. 7, the rib type optical waveguide 10 and an other protruding portion 11 different from the rib type optical waveguide are formed by the first recess portion C1 on the substrate 1 disposed under the control electrode 2. A third recess portion C3 that is further recessed from the shallowest position of the first recess portion C1 like the second recess portion C2 can be provided near a base part of the protruding portion 11. Disposing the control electrode 2 in at least a part of the third recess portion C3 increases the joining strength between the control electrode 2 and the substrate 1, and an adverse effect such as peeling of the electrode can be suppressed.

Two rib type optical waveguides 10 in FIG. 7 are, for example, two branched waveguides constituting a Mach-Zehnder type optical waveguide. Of course, the configuration of the third recess portion C3 in FIG. 7 is not limited to the Mach-Zehnder type optical waveguide.

Figure 8:
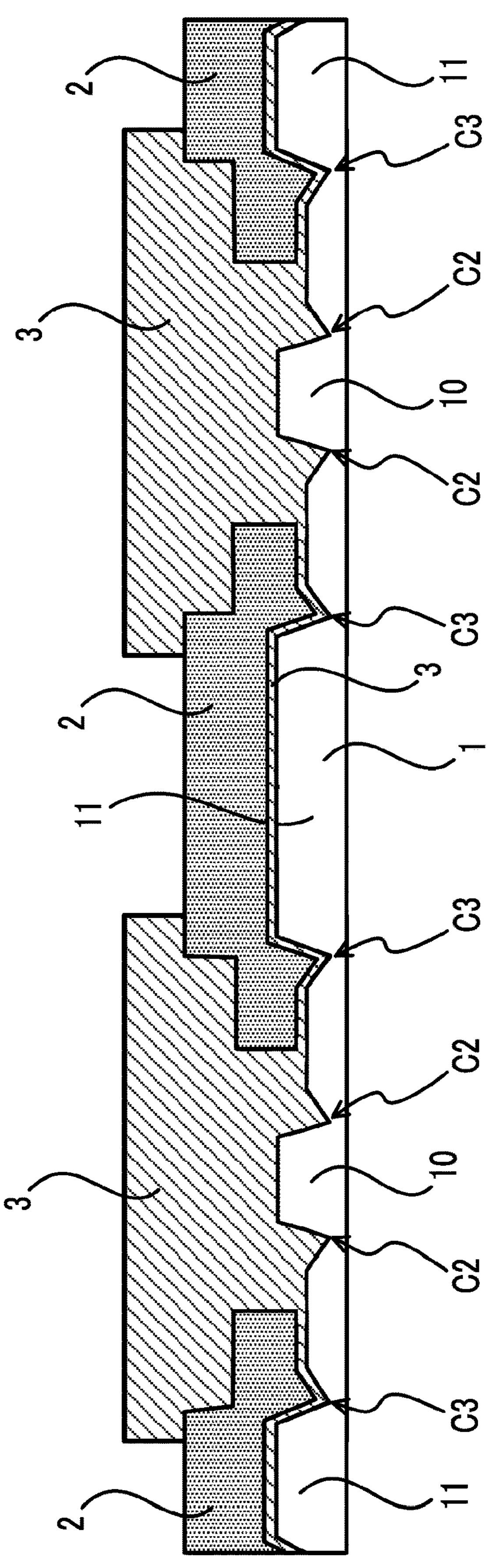
FIG. 8 is a cross section view illustrating a fourth example related to the optical waveguide device of the present invention.

Furthermore, as illustrated in FIG. 8, the dielectric layer 3 can be disposed on the lower side of the control electrode 2. Disposing the dielectric layer 3 in at least a part of the third recess portion C3 can increase joining strength between the dielectric layer 3 and the substrate 1.

Simulation is performed using the optical waveguide device illustrated in FIGS. 3 to 5 to evaluate the optical absorption loss with respect to VπL corresponding to the drive voltage in accordance with a change of a structure (θ2, hr, S) of the second recess portion.

As a condition of the simulation, an LN substrate, a control electrode of Au, and a dielectric film of a permanent resist are assumed, and the following numerical values are set.

(Various Numerical Value Settings: Cross Section Shape)

Thickness H of the substrate 1: 600 nm

Thickness h of the shallowest part of the first recess portion of the substrate 1: 300 nm Inclination (θ1) of the side surface of the rib type optical waveguide: 65 degrees Clearance (refer to FIG. 3) of the control electrode 2 in which the rib type optical waveguide 10 is interposed: 3.9 μm Parameters for changing the structure are set to the following numerical values.

Inclination angle θ2 of the inclined surface S2: 3.5 degrees, 4 degrees, 7 degrees, 10 degrees, 20 degrees, and 40 degrees Depth hr of the second recess portion: 0 to 0.2 μm Cross section area S of the second recess portion: 0 to 0.35 $\mu m^2$ FIGS. 9 to 13 illustrate various simulation results.

Figure 9:
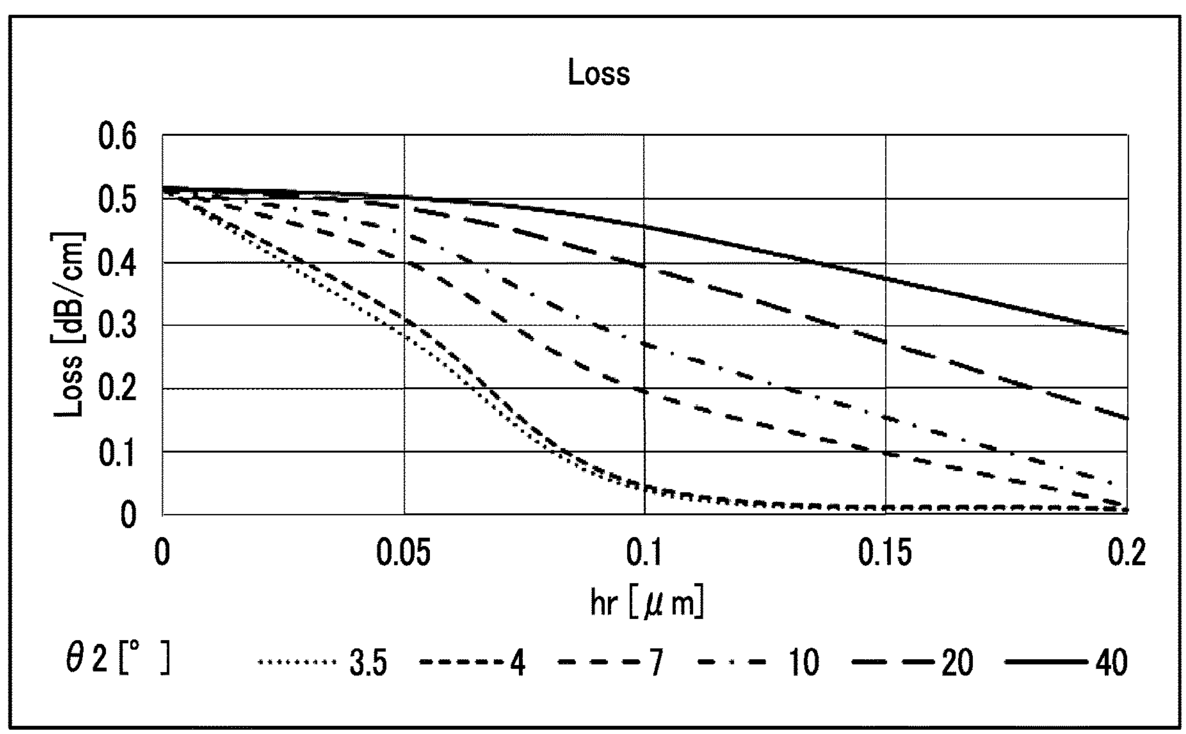
FIG. 9 is a graph showing a change in an electrode absorption loss (Loss) caused by changing a structure (θ2, hr) of a second recess portion.

FIG. 9 is a graph showing a change in an electrode absorption loss (Loss, optical absorption loss) caused by changing the structure (θ2, hr) of the second recess portion. A change in the electrode absorption loss (Loss) with respect to the depth hr of the second recess portion in a case where the inclination angle θ2 is changed is shown.

From the graph, it is easily understood that as the inclination angle θ2 is decreased, the electrode absorption loss is decreased. In a case where θ2 is 20 degrees or less, the electrode absorption loss is decreased as the depth hr of the second recess portion is increased. In addition, in a case where θ2 is 4 degrees or less, it is understood that the electrode absorption loss can be reduced even with the depth hr of approximately 0.07 μm.

Figure 10:
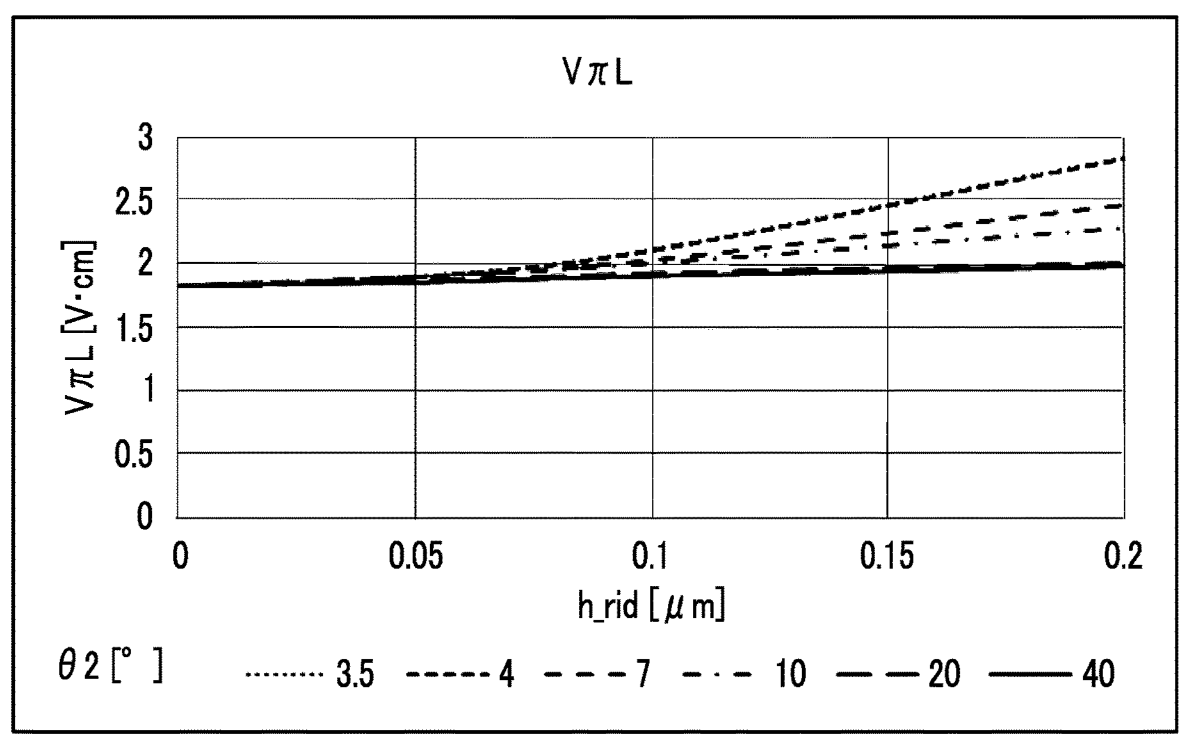
FIG. 10 is a graph showing a change in VπL caused by changing the structure (θ2, hr) of the second recess portion.

FIG. 10 is a graph showing a change in VπL caused by changing the structure (θ2, hr) of the second recess portion.

While VπL (V·cm) corresponding to the drive voltage is increased as the depth hr is increased, this tendency is more noticeable as the inclination angle θ2 is decreased. In addition, in a case where the depth hr is 0.07 μm or less, a change in the inclination angle θ2 has almost no effect.

Figure 11:
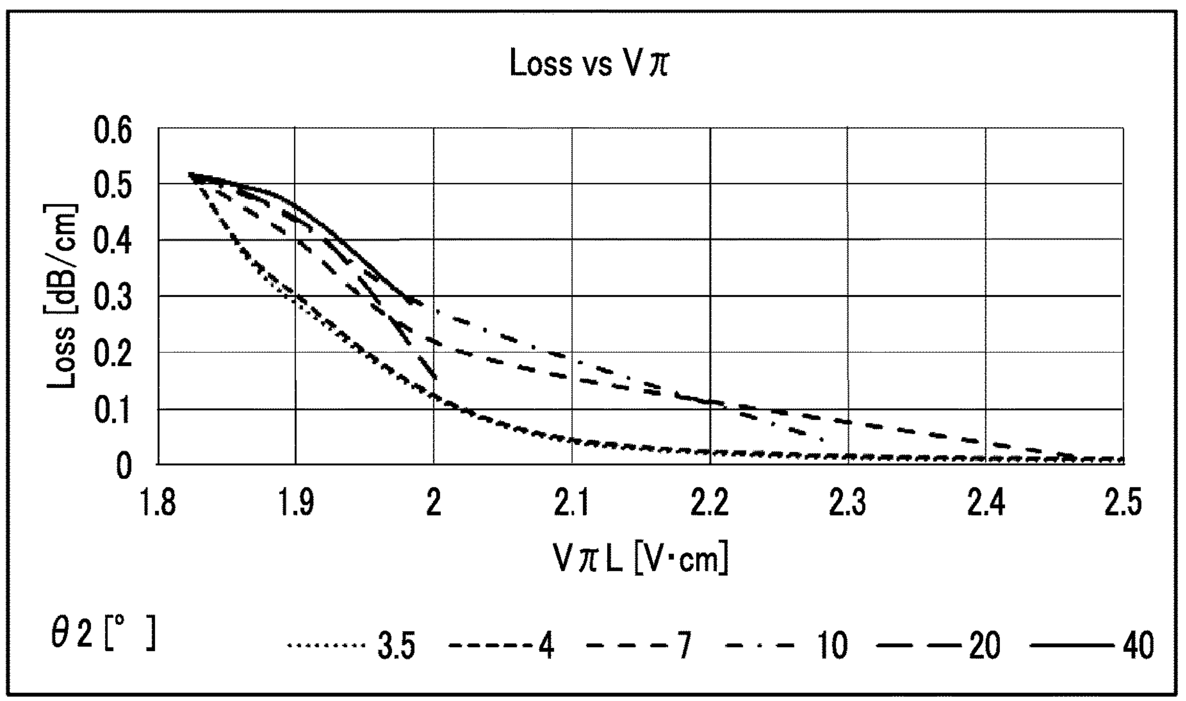
FIG. 11 is a graph showing a change in a relationship between VπL and the electrode absorption loss (Loss) caused by changing the structure (θ2, hr) of the second recess portion.

FIG. 11 is a graph showing a change in a relationship between VπL and the electrode absorption loss (Loss) caused by changing the structure (θ2, hr) of the second recess portion.

As the drive voltage is increased, the electrode absorption loss is decreased. Particularly, in the case of Vπ=2V or less with L=1 cm (in the case of VπL=2.0 [V·cm] or less), decreasing θ2 increases an effect of suppressing the electrode absorption loss. Particularly, in a case where θ2 is 4 degrees or less, the electrode absorption loss can be significantly suppressed.

Figure 12:
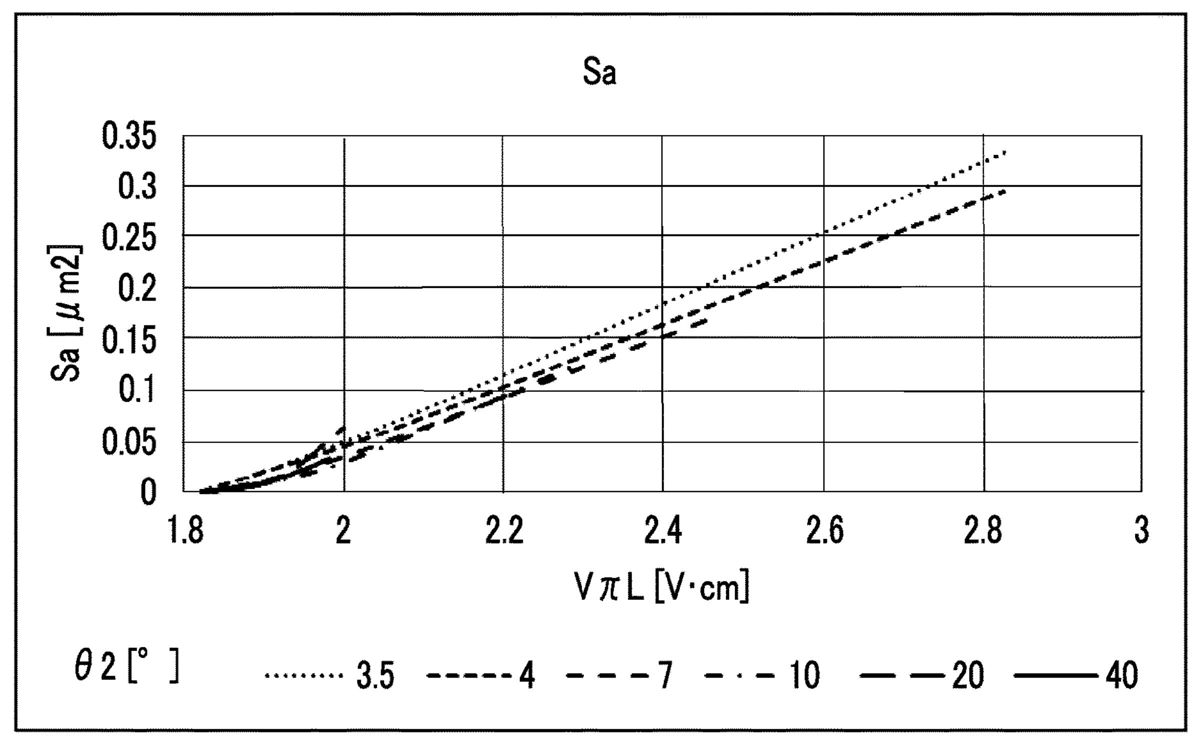
FIG. 12 is a graph showing a change in VπL caused by changing a cross section area S of the second recess portion.

FIG. 12 is a graph showing a change in VπL caused by changing the cross section area S (Sa) of the second recess portion.

A change in the inclination angle θ2 of the inclined surface S2 has a relatively small effect. In the case of VπL=2.0 [V·cm] or less, it is understood that the cross section area S is preferably set to 0.05 $\mu m^2$ or less.

Figure 13:
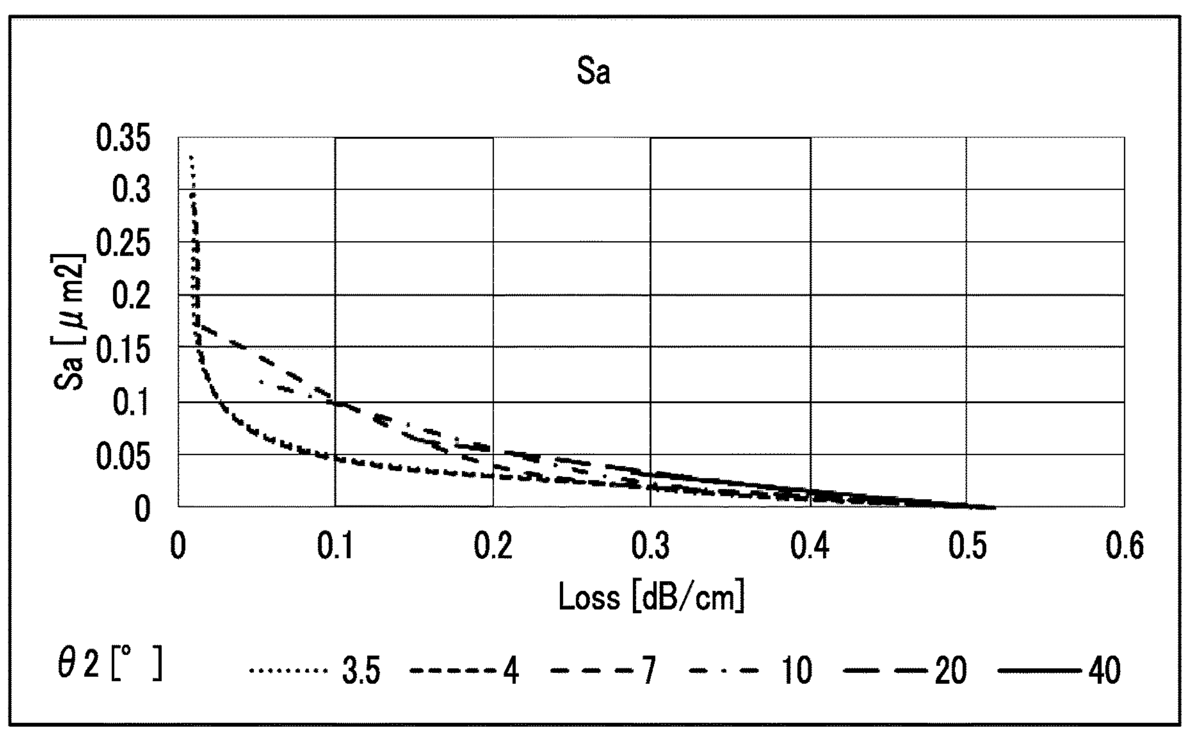
FIG. 13 is a graph showing a change in the electrode absorption loss (Loss) caused by changing the cross section area S of the second recess portion.

FIG. 13 is a graph showing a change in the electrode absorption loss (Loss) caused by changing the cross section area S (Sa) of the second recess portion.

As the cross section area S (Sa) is decreased, the electrode absorption loss is increased. For example, in a case where the inclination angle θ2 is 4 degrees or less, it is understood that the electrode absorption loss can be set to 0.1 [dB/cm] even in a case where the cross section area S is 0.05 $\mu m^2$.

Next, examples of applying the optical waveguide device of the present invention to an optical modulation device and to an optical transmission apparatus will be described. While an example of a high bandwidth-coherent driver modulator (HB-CDM) will be used in the following description, the present invention is not limited to the example and can also be applied to an optical phase modulator, an optical modulator having a polarization combining function, an optical waveguide device in which a larger or smaller number of Mach-Zehnder type optical waveguides are integrated, a device joined to an optical waveguide device including other materials such as silicon, a device used as a sensor, and the like.

Figure 14:
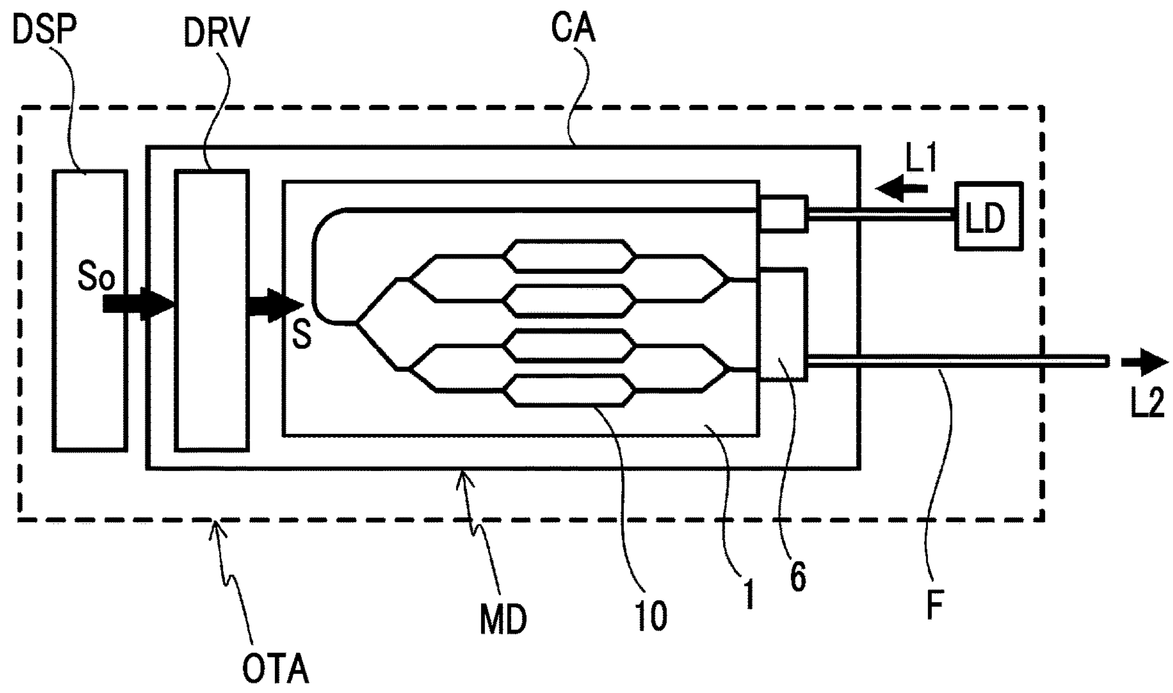
FIG. 14 is a diagram illustrating an example of an optical transmission apparatus of the present invention.

As illustrated in FIG. 14, the optical waveguide device includes the optical waveguide 10 formed on the optical waveguide substrate 1, and the control electrode (not illustrated) such as the modulation electrode that modulates the light wave propagating through the optical waveguide 10. The optical waveguide device is accommodated inside a case CA. Furthermore, an optical modulation device MD can be configured by providing an optical fiber (F) through which the light wave is input into the optical waveguide or output from the optical waveguide. In FIG. 13, the optical fiber F is optically coupled to the optical waveguide 10 inside the optical waveguide device using an optical block including an optical lens, a lens barrel, a polarization combining unit 6, and the like. The present invention is not limited to the optical fiber F in FIG. 13. The optical fiber may be introduced into the case through a through-hole that penetrates through a side wall of the case. The optical fiber may be directly joined to an optical component or to the substrate, or the optical fiber having a lens function in an end portion of the optical fiber may be optically coupled to the optical waveguide inside the optical waveguide device. In addition, a reinforcing member (not illustrated) can be disposed to overlap along an end surface of the optical waveguide substrate 1 in order to stably join the optical fiber to the optical block.

An optical transmission apparatus OTA can be configured by connecting, to the optical modulation device MD, an electronic circuit (digital signal processor DSP) that outputs a modulation signal So causing the optical modulation device MD to perform a modulation operation. In order to obtain a modulation signal S to be applied to the optical waveguide device, it is required to amplify the modulation signal So output from the digital signal processor DSP. Thus, in FIG. 13, the modulation signal is amplified using a driver circuit DRV. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

While input light L1 of the optical modulation device MD may be supplied from an outside of the optical transmission apparatus OTA, a semiconductor laser (LD) can also be used as a light source as illustrated in FIG. 13. Output light L2 modulated by the optical modulation device MD is output to the outside through the optical fiber F.

INDUSTRIAL APPLICABILITY

As described above, according to the present invention, it is possible to provide an optical waveguide device in which absorption of light propagating through an optical waveguide by a control electrode is suppressed and in which peeling of a dielectric layer covering the optical waveguide is prevented. Furthermore, it is possible to provide an optical modulation device and an optical transmission apparatus using the optical waveguide device.

REFERENCE SIGNS LIST

1: substrate (thin plate, film body) on which optical waveguide is formed
2: control electrode
3: dielectric layer
10: optical waveguide (rib type optical waveguide)
11: protruding portion
C1: first recess portion
C2: second recess portion
C3: third recess portion
S1, S2: inclined surface
θ1, θ2: inclination angle
H: thickness of substrate 1
h: thickness of shallowest part of first recess portion of substrate 1
hr: depth of second recess portion
F: optical fiber
LD: light source
CA: case
MD: optical modulation device
DRV: driver circuit
DSP: digital signal processor
OTA: optical transmission apparatus

The invention claimed is:

1. An optical waveguide device comprising:

a substrate on which an optical waveguide is formed; and a control electrode disposed next to the optical waveguide on the substrate, wherein a thickness of the substrate is 1 μm or less, the optical waveguide is a rib type optical waveguide whose height is 70 percent or less of the thickness of the substrate, an end portion of the control electrode facing to the rib type optical waveguide is positioned in a first recess portion of the substrate that forms the rib type optical waveguide, a dielectric layer that covers the rib type optical waveguide is provided, a second recess portion that is further recessed from a shallowest position of the first recess portion is provided in a part of the first recess portion at a base part of the rib type optical waveguide, the dielectric layer is disposed in the second recess portion and continuously formed between the rib type optical waveguide and the control electrode, the second recess portion includes an inclined surface that becomes shallower towards the control electrode from the rib type optical waveguide, and an inclination angle formed by the inclined surface with respect to a plane parallel to an entire surface of the substrate is 20 degrees or less, and a depth of a deepest position of the second recess portion based on the shallowest position of the first recess portion is 0.07 μm or less.

2. The optical waveguide device according to claim 1, wherein a cross section area that is a cross section area of the second recess portion formed by a cross section of the second recess portion perpendicular to a direction in which the rib type optical waveguide extends and that is occupied by a part deeper than the shallowest position of the first recess portion is 0.05 $\mu m^2$ or less.

3. The optical waveguide device according to claim 1, wherein the substrate disposed under the control electrode includes a protruding portion that is formed in the first recess portion and that is different from the rib type optical waveguide, a third recess portion that is further recessed from the shallowest position of the first recess portion is provided in a part of the first recess portion at a base part of the protruding portion, and the control electrode is disposed in at least a part of the third recess portion.

4. An optical modulation device comprising:

the optical waveguide device according to claim 1;

a case accommodating the optical waveguide device; and an optical fiber through which a light wave is input into the optical waveguide or output from the optical waveguide.

5. The optical modulation device according to claim 4, wherein the control electrode modulates the light wave propagating through the optical waveguide, and an electronic circuit that amplifies a modulation signal to be input into the modulation electrode is provided inside the case.

6. An optical transmission apparatus comprising:

the optical modulation device according to claim 5;

a light source that inputs the light wave into the optical modulation device; and another electronic circuit that outputs a modulation signal to the optical modulation device.

* * * * *